United States Patent [19]

Nogiwa et al.

[11] Patent Number: 4,748,206

[45] Date of Patent: May 31, 1988

[54] POLYOLEFIN COMPOSITION AND THE SAME USED FOR VEHICLE EXTERIOR MEMBERS

[75] Inventors: Motomi Nogiwa, Zushi; Sachio Akai, Fujisawa; Hiroshi Furuhashi, Kawasaki; Kenji Tanaka, Sagamihara; Toshimasa Takakusaki, Kawasaki; Yoichi Kawai, Yokohama; Masaru Abe, Yokohama; Katsumi Sekiguchi, Yokohama, all of Japan

[73] Assignee: Nippon Petrochemicals Company, Limited, Tokyo, Japan

[21] Appl. No.: 929,071

[22] Filed: Nov. 7, 1986

[30] Foreign Application Priority Data

Nov. 11, 1985 [JP] Japan ................. 60-252525

[51] Int. Cl.$^4$ ............ C08L 23/18; C08L 23/12; C08L 23/16; C08L 53/00
[52] U.S. Cl. .................... 525/88; 525/240; 524/505; 524/528
[58] Field of Search .................. 525/88, 240

[56] References Cited

U.S. PATENT DOCUMENTS

| | | | |
|---|---|---|---|
| 4,302,557 | 11/1981 | Yoshimura et al. | 525/240 |
| 4,395,519 | 7/1983 | Minami et al. | 525/240 |
| 4,521,566 | 6/1985 | Galli et al. | 525/240 |
| 4,565,847 | 1/1986 | Bahl et al. | 525/240 |
| 4,621,119 | 11/1986 | Lu | 525/240 |
| 4,634,735 | 1/1987 | Thiersault et al. | 525/240 |
| 4,634,740 | 1/1987 | Fujita et al. | 525/240 |

FOREIGN PATENT DOCUMENTS

| | | |
|---|---|---|
| 58-101135A | 6/1983 | Japan . |
| 59-043043A | 3/1984 | Japan . |
| 2006232 | 5/1979 | United Kingdom . |

*Primary Examiner*—Carman J. Seccuro
*Attorney, Agent, or Firm*—Scully, Scott, Murphy & Presser

[57] ABSTRACT

A polyolefin composition and the same especially used for producing vehicle exterior members which is excellent in softness, impact resistance, moldability, appearance, restorable property and so forth. The composition comprises 20 to 70% by weight of a crystalline propylene polymer (a); 10 to 50% by weight of a substantially amorphous α-olefin copolymer (b); 5 to 50% by weight of an ethylene-α-olefin copolymer (c) which is 0.860 to 0.910 g/cm$^3$ in density, 10% by weight or more in boiling n-hexane insoluble matter and 100° C. or higher in the maximum peak temperature $T_m$ according to the differential scanning calorimetry (DSC); and 5 to 30% by weight of an ethylene polymer (d) of 0.910 to 0.965 g/cm$^3$ in density, wherein the total of said components (a), (b), (c) and (d) is 100% by weight.

13 Claims, 1 Drawing Sheet

DSC MEASUREMENT OF ETHYLENE COPOLYMERS b: E P R c: ETHYLENE-α-OLEFIN COPOLYMER
 (Used in the present invention)

d: L L D P E

POLYOLEFIN COMPOSITION AND THE SAME USED FOR VEHICLE EXTERIOR MEMBERS

BACKGROUND OF THE INVENTION (1) Field of the Invention

This invention relates to a polyolefin composition and the same that is especially suitable for use in producing vehicle exterior members. More particularly, the invention relates to a polyolefin composition which is excellent in several properties such as softness, impact resistance, shape restorable property, appearance of molded articles, moldability and paintability and which is useful in industrial fields, for example, the production of various exterior parts of automobiles.

(2) Description of the Prior Art

The thermoplastic polyolefin elastomer (TPE) has been hitherto used in various fields of industry because its specific gravity is low, thermal resistance is good and the balance among several properties, for example, between rigidity and impact resistance, is relatively good. In addition it is not expensive.

The TPE is generally a blended product of a hard segment of crystalline polypropylene (PP) or polyethylene and a soft segment of an olefin elastomer such as ethylenepropylene rubber (EPR), polyisobutylene or polybutadiene. It is often subjected to partial cross-linking treatment in order to improve its physical properties.

In recent years, however, especially with the expanding uses of the material for automobile parts, required properties have been diversified. For instance, with regard to automobile exterior members, required merits are good moldability, appearance (gloss) of molded articles, paintability, the property that the deformation caused by impact is easily restored (restorable property) as well as the thermal resistance and low-temperature impact resistance.

The conventional TPE could not always meet all of these requirements. For example, a composition of PP, EPR, polyethylene of 0.915–0.97 g/cm$^3$ in density and peroxide is proposed in Japanese Laid-Open Patent Publication No. 54-41950; a composition of PP, EPR and medium density polyethylene is proposed in Japanese Laid-Open Patent Publication No. 55-139445; a composition of PP, EPR, high density polyethylene and talc is proposed in Japanese Patent Publication No. 59-49252 (U.S. Pat. No. 4,412,016); a composition of PP, EPR and ethylene-α-olefin linear copolymer is proposed in Japanese Laid-Open Patent Publication Nos. 58-42643 and 58-80335. Nevertheless, these compositions are still unsatisfactory in view of the balance between rigidity and low-temperature impact resistance. In addition, their restorable property is not good.

BRIEF SUMMARY OF THE INVENTION

In view of the present status of the art with regard to the TPE consisting essentially of PP and EPR, the inventors have carried out extensive study in order to develop an improved TPE which is excellent in low-temperature impact resistance, moldability, glossiness, paintability and restorable property, thereby accomplishing the present invention.

It is, therefore, the primary object of the present invention to provide an improved polyolefin composition which is free from the above disadvantages in the conventional art.

Another object of the present invention is to provide a polyolefin composition which is excellent in low-temperature impact resistance, moldability, glossiness, paintability and restorable property as well as thermal resistance.

A further object of the present invention is to provide a TPE composition which is particularly suitable for use in producing vehicle exterior members.

In accordance with the present invention, the composition comprises: 20 to 70% by weight of a crystalline propylene polymer (PP) (a); 10 to 50% by weight of a substantially amorphous α-olefin copolymer (b); 5 to 50% by weight of an ethylene-α-olefin copolymer (ULDPE) (c) which is 0.860 to 0.910 g/cm$^3$ in density, 10% by weight or more in boiling n-hexane insoluble matter ($C_6$ insoluble matter) and 100° C. or higher in the maximum peak temperature ($T_m$) according to the differential scanning calorimetry (DSC); and 5 to 30% by weight of an ethylene polymer (PE) (d) of 0.910 to 0.965 g/cm$^3$ in density.

Furthermore, the TPE composition which is suitable for use in producing vehicle exterior members comprises the above-specified composition or a mixture of an inorganic filler or fillers and the above-specified composition.

BRIEF DESCRIPTION OF THE DRAWING

The nature, principle and detail of the invention will be more clearly apparent from the following detailed description with the accompanying drawing, in which.

DETAILED DESCRIPTION OF THE INVENTION

Figure 1:
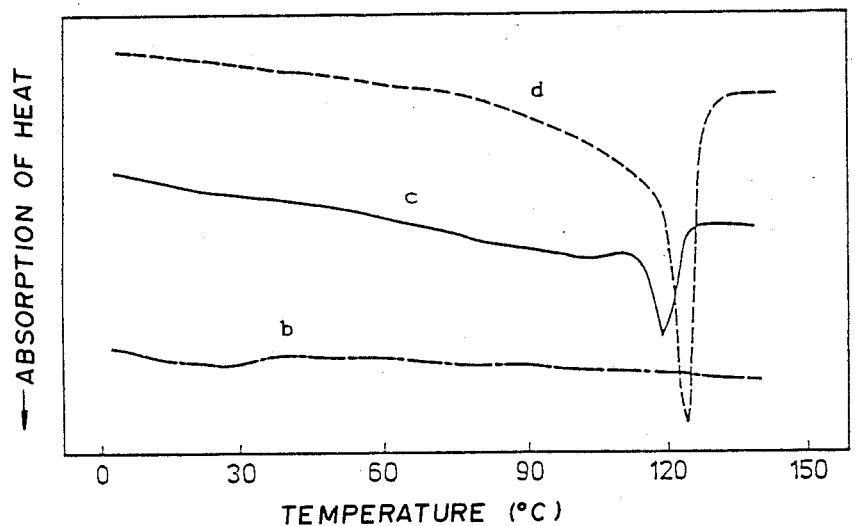
FIG. 1 is a graphic chart showing the results of DSC measurement of ethylene copolymers.

The PP (a) used in the present invention is an isotactic or syndiotactic PP of a high degree of crystallinity. Especially, preferable one is a block-copolymer (block PP) of propylene and a small amount of other α-olefins such as ethylene, butene-1, hexene-1 and 4-methylpentene-1. The content of α-olefin in the block PP is preferably in the range of 3 to 25% by weight and more preferably, 5 to 20% by weight. In the case that the content of the α-olefin is less than 3% by weight in block PP, the impact resistance of the above-specified composition is sometimes unsatisfactory, meanwhile when the content of the α-olefin is more than 25% by weight, the thermal resistance is sometimes low. The melt flow rate (MFR) of the used PP is preferably 1 to 100 g/10 min. at 230° C. When PP of less than 1 g/10 min. in MFR is used, the moldability of the composition is sometimes not good to produce articles of undesirable appearance. While, the use of PP of more than 100 g/10 min. in MFR sometimes results in unsatisfactory impact resistance.

In the present invention, 20 to 70% by weight, preferably 30 to 60% by weight of the above-described PP is used. In the case that the quantity of PP is less than 20% by weight, the thermal resistance of the obtained composition is not good. On the other hand, when the quantity of PP is more than 70% by weight, the impact resistance, paintability and restorable property are not satisfactory.

The substantially amorphous α-olefin copolymer (b) used in the present invention is a copolymer of two or more kinds of α-olefins having 2 to 8 carbon atoms. Typical examples of the copolymer (b) are ethylene-propylene copolymer rubber (EPR) including ethylenepropylene-diene copolymer rubber (EPDM), ethylene-butene-1 copolymer rubber (e.g., trademark "Tafmer A" made by Mitsui Petrochemicals Industries, Ltd.) and propylene-butene-1 copolymer rubber. Most of these copolymers have densities in the range of about 0.86 to 0.89 g/cm$^3$, which range overlaps with the density range of ULDPE (c). However, as the copolymer (b) is amorphous, the $C_6$ insoluble matter is not more than 10% and $T_m$ value is below 100° C. In view of these points, the copolymer (b) can be clearly discriminated from ULDPE. It is desirable that MFR values at 230° C. of these copolymers are in the range of 0.1 to 10 g/10 min. In the case that MFR is higher than 10 g/10 min., the impact resistance of composition is sometimes insufficient, while if the value is lower than 0.1 g/10 min., the flowability of obtained composition is sometimes unsatisfactory.

In the present invention, 10 to 50% by weight, preferably 15 to 45% by weight of the above copolymer (b) is used. In the case that the quantity of the copolymer (b) is less than 10% by weight, impact resistance and the paintability of the obtained composition is not good. On the other hand, when the quantity thereof is more than 50% by weight, the thermal resistance is worse and formed products sometimes become sticky.

The ULDPE (c) used in the present invention is a copolymer of ethylene and α-olefin having 3 to 12 carbon atoms, preferably 3 to 8 carbon atoms.

Typical examples of the α-olefin include propylene, butene-1, 4-methylpentene-1, hexene-1, octene-1, decene-1 and dodecene-1. The content of the α-olefin in the ethylene-α-olefin copolymer is 2 to 40 mol %, and preferably 5 to 20 mol %.

Now, the process for producing the ULDPE (c) used in the present invention will be described.

Firstly, the used catalyst system is composed of a solid catalyst component (containing magnesium and titanium) and an organic aluminum compound. The solid catalyst component is an inorganic solid compound containing magnesium on which a titanium compound is supported in a known manner. Examples of the inorganic solid compounds include metallic magnesium, magnesium hydroxide, magnesium carbonate, magnesium oxide and magnesium chloride; a double salt, double oxide, carbonate, chloride or hydroxide containing magnesium and a metal selected from silicon, aluminum and calcium; and an inorganic solid compound treated or reacted with an oxygen-containing compound, sulfur-containing compound, aromatic hydrocarbon or halogen-containing material.

Examples of the above-mentioned oxygen-containing compounds include water; organic oxygen-containing compounds such as alcohol, phenol, ketone, aldehyde, carboxylic acid, ester, polysiloxane and acid amide; and inorganic oxygen-containing compounds such as metallic alkoxide and oxychlorides of metals. Examples of the sulfur-containing compounds include organic sulfur-containing compounds such as thiol and thioether, and inorganic sulfur-containing compounds such as sulfur dioxide, sulfur trioxide and sulfuric acid. Examples of the aromatic hydrocarbons include monocyclic and polycyclic aromatic hydrocarbons such as benzene, toluene, xylene, anthracene and phenanthrene. Further, examples of the halogen-containing compounds include chlorine, hydrogen chloride, metallic chloride and organic halide.

Examples of the titanium compounds include a halide, alkoxyhalide, alkoxide and halogenated oxide of titanium. As the titanium compounds, tetravalent and trivalent titanium compounds are preferred. Preferable examples of the tetravalent titanium compounds are represented by the general formula Ti(OR)$_n$X$_{4-n}$ wherein R is an alkyl group, aryl group or aralkyl group having 1 to 20 carbon atoms; X is a halogen atom, and n is a value satisfying the relation of $0 \leq n \leq 4$. Preferable examples of these titanium compounds include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium.

As examples of the trivalent titanium compounds, there are trihalogenated titanium compounds that are prepared by reducing tetrahalogenated titanium such as titanium tetrachloride and titanium tetrabromide with hydrogen, aluminum, titanium or an organic metallic compound of a metal in groups I to III of the periodic table. Furthermore, other usable exemplary compounds are those which are obtained by reducing, with an organic metallic compound of a metal in group I to III of the periodic table, a tetravalent halogenated alkoxytitanium represented by the general formula Ti(OR)$_m$X$_{4-m}$ wherein R is an alkyl group, aryl group or aralkyl group having 1 to 20 carbon atoms; X is a halogen atom, and m is a value satisfying the relation of $0<m<4$.

Of these titanium compounds, the tetravalent titanium compounds ar particularly preferred.

As another example of the catalyst system, there is a combination of a reaction product and an organic aluminum compound, which reaction product is prepared by reacting an organic magnesium compound such as a so-called Grignard reagent with a titanium compound. Examples of the above-mentioned organic magnesium compounds include those having the general formula RMg X, R$_2$Mg, RMg(OR) (wherein R is an organic residue having 1 to 20 carbon atoms and X is a halogen atom) and the like, their ether complexes and the compounds which are prepared by modifying these organic magnesium compounds with other organic metallic compounds such as an organic sodium, organic lithium, organic potassium, organic boron, organic calcium and organic zinc.

Another example of the catalyst system is a combination of a solid material and an organic aluminum compound, where the solid material is the one which is prepared by bringing an inorganic oxide such as SiO$_2$ or Al$_2$O$_3$ into contact with a solid catalyst component containing at least magnesium and titanium. CaO, B$_2$O$_3$ and SnO$_2$ as well as their double oxides can also be used as the inorganic oxides without any trouble, besides the above SiO$_2$ and Al$_2$O$_3$.

The organic aluminum compounds which are combined with the above-mentioned solid catalyst components are preferably represented by the general formulae: R$_3$Al, R$_2$AlX, RAlX$_2$, R$_2$AlOR, RAl(OR)X and R$_3$Al$_2$X$_3$ wherein R is the same or different alkyl group, aryl group or aralkyl group having 1 to 20 carbon atoms and X is a halogen atom. Examples of the organic aluminum compounds include triethylaluminum, triisobutylaluminum, trihexylaluminum, trioctylaluminum, diethylaluminum chloride, diethylaluminum ethoxide, ethylaluminum sesquichloride and their mixtures.

The quantity of the organic aluminum compound to be used is not particularly limited, but it is usually in the range of 0.1 to 1,000 mol times as much as the quantity of the titanium compound.

The copolymerization can be carried out usually in the like manner as the polymerization of an olefin with the use of Ziegler catalyst. That is, the reaction can be preformed substantially in the condition free from oxygen, water and the like, in a gaseous phase or in the presence of an inert solvent or in the monomer itself as a solvent. With regard to the conditions for the copolymerization of ethylene and α-olefin, the temperature is within the range of 20° to 300° C., preferably 40° to 200° C., and the pressure is within the range of ordinary pressure to 70 kg/cm$^2$.G, and preferably 2 to 60 kg/cm$^2$.G. The molecular weight of the copolymer to be produced can be regulated to some extent by changing the conditions such as polymerization temperature, molar ratio of the catalyst and the like. However, it can be effectively achieved by adding hydrogen to the copolymerization system. Needless to say, the polymerization reaction comprising two or more steps may be carried out without any problem in which the reaction conditions such as hydrogen concentration, polymerization temperature or else are varied.

The ULDPE (c) used in the present invention has a density of 0.860 to 0.910 g/cm$^3$, a C$_6$ insoluble matter of 10% by weight or more and a T$_m$ of 100° C. or above. When a ULDPE (c) of a density of lower than 0.860 g/cm$^3$ is used, the thermal resistance of obtained composition is low. Meanwhile, when a ULDPE (c) of 0.910 g/cm$^3$ or higher is used, the impact resistance and restorable property of the obtained composition is unsatisfactory. In the case that the C$_6$ insoluble matter is less than 10% by weight and T$_m$ is lower than 100° C., the thermal resistance and restorable property of obtained composition are insufficient.

Furthermore, its MFR (190° C.) is desirably in the range of 0.1 to 30 g/10 min. When the MFR is lower than 0.1 g/10 min., the flowability of obtained composition is sometimes not good, while the MFR of higher than 30 g/10 min. sometimes provides a worse impact resistance.

The content of ULDPE (c) in the composition of the present invention is in the range of 5 to 50% by weight. When the quantity of ULDPE (c) is less than 5%, the impact resistance, paintability and restorable property are not good. When the quantity is more than 50%, the thermal resistance is low and formed products become sticky.

The measuring procedures of the C$_6$ insoluble matter and the T$_m$ in the present invention are as follows:

(Measurement of C$_6$ Insoluble Matter)

A 200 μm thick sheet is made by a hot press and three small sheets (20 mm×30 mm) are cut out from the sheet. These cut sheets are extracted with boiling n-hexane for 5 hours using a double pipe Soxhlet's extractor. After that, each n-hexane insoluble substance is taken out and dried under vacuum at 50° C. for 7 hours. The C$_6$ insoluble matter is then calculated by the following formula:

$$C_6 \text{ insoluble matter (wt \%)} = \frac{\text{Weight of sheet after extraction}}{\text{Weight of sheet before extraction}} \times 100$$

(Measurement of T$_m$)

A sample having a weight of about 5 mg is cut out from a 100 μm thick film that was prepared by a hot press. The sample is then set on a differential scanning calorie meter and the temperature is then raised to 170° C. and this temperature is maintained for 15 minutes. After that, the temperature is lowered to 0° C. at a rate of 2.5° C./min. Then, measurement is done with raising the temperature from this level up to 170° C. at a rate of 10° C./min. A temperature at the position of maximum peak which has appeared during the temperature rise from 0° C. to 170° C. is regarded as T$_m$.

The foregoing ULDPE (c) has both highly crystalline portions and amorphous portions which are produced by the copolymerization of ethylene with the α-olefin. Accordingly, the ethylene copolymer possesses mechanical strength and thermal resistance that are particular to conventional crystalline polyolefins and the rubber-like elasticity and softness that are particular to amorphous polymers.

As commercially available ethylene-α-olefin copolymers of this kind, there are linear low density polyethylene (LLDPE) and EPR.

The ULDPE (c) in the present invention is apparently different from the conventional LLDPE and EPR.

FIG. 1 shows the behavior of crystalline melting of various kinds of ethylene-α-olefin copolymers including ULDPE (c) of the present invention, LLDPE and EPR which were measured by DSC. As will be understood from the same figure, the LLDPE still has high crystallinity by which the softness, restorable property and low-temperature impact resistance are impaired.

The commercially available EPR is prepared by using a catalyst containing vanadium, so that the EPR has almost no crystallinity or its crystalline portion is very little, and the T$_m$ by DSC is lower than 100° C. This fact shows that thermal resistance and mechanical strength are low.

The ethylene polymer (d) used in the present invention has a density of 0.910 to 0.965 g/cm$^3$, which is exemplified by the polyethylene prepared by high pressure radical polymerization and the polyethylene obtained by ionic polymerization. Among them, the copolymer of ethylene with α-olefin, that is obtained by ionic polymerization and has a density of 0.915 to 0.940 g/cm$^3$, is especially preferable. In the ionic polymerization, catalysts to be used are Ziegler catalyst of a basic combination of a titanium or zirconium compound with an organic aluminum, or Phillips catalyst of a chromium compound base. The polymerization is generally carried out under low temperature and low to medium pressure conditions, however, the polymerization is sometimes done under higher pressure (above 1000 kg/cm$^2$) conditions.

The α-olefins that are used in the foregoing polymerization are exemplified by propylene, butene-1, hexene-1, 4-methylpentene-1 and octene-1. The obtained polymer is widely used as linear low or medium density polyethylene.

The preferable range of MFR (190° C.) of these ethylene polymers (d) is the same as that of the foregoing ULDPE (c) for the same reason.

In the present invention, this polymer (d) is used as much as 5 to 30% by weight, and preferably 10 to 25% by weight. In the case that the quantity of polymer (d) is less than 5% by weight, formed products are sticky, on the other hand, when more than 30% by weight of the polymer is contained, the impact resistance is lowered.

The second object of the present invention is to provide a composition used for vehicle exterior members which comprises the foregoing polyolefin composition itself or a mixture of the composition with inorganic fillers (e).

The inorganic fillers (e) are exemplified by powdery or granular fillers such as calcium carbonate, calcium hydroxide, calcium sulfate, calcium silicate, magnesium oxide, magnesium hydroxide, basic magnesium carbonate, magnesium-calcium carbonate, aluminum hydroxide, barium carbonate, barium hydroxide, zinc carbonate, clay, diatomaceous earth, talc, alumina, siliceous sand, glass powder, iron oxide, metallic powder, silicon carbide, silicon nitride, silica, boron nitride, aluminum nitride and carbon black; flaky or scaly fillers such as mica, glass flakes, sericite, pyrophyllite, graphite, metal foils such as aluminum falkes; hollow fillers such as Shirasu balloon, metallic balloon, glass balloon and pumice; and mineral fibers such as glass fiber, carbon fiber, graphite fiber, whisker, metal fiber, silicone carbide fiber, asbestos and wollastonite. Among them, preferable ones are calcium carbonate, calcium silicate, magnesium hydroxide, clay, talc, silica, carbon black, mica, glass flakes, glass fiber, carbon fiber, graphite fiber and whisker, and more preferable ones are calcium carbonate, talc and mica.

The addition quantity of these fillers (e) is up to 100 parts by weight to 100 parts by weight of the composition of the present invention. When the addition quantity of filler exceeds 100 parts by weight, it is not desirable because the impact resistance of formed products is lowered.

In the present invention, if any of the above inorganic fillers (e) is used, it is preferable that the filler is surface-treated with a fatty acid such as stearic acid, oleic acid, palmitic acid or their metal salts; paraffin wax, polyethylene wax, or their modified products; or organic silane, organic borane or organic titanate.

As described above, the composition of the present invention is excellent not only in several properties of thermal resistance, low-temperature impact resistance, moldability and appearance (glossiness) of formed products, but also in paintability and restorable property. Therefore, the composition according to the present invention is suitably used for producing vehicle exterior members such as bumper, facia, spoiler, front apron, fender, side protector, mudguard, sill and ornamental accessories.

Furthermore, when an inorganic filler is added to the composition, the properties of obtained vehicle exterior members are much improved not only in scratch resistance but also in thermal resistance, paintability and rigidity.

As far as the characteristic features of the present invention is not much impaired, the composition of the present invention can be added with other components such as other thermoplastic resins, antioxidants or thermal stabilizers (hindered phenols, phosphites, hydroquinones and thioethers), UV absorbers (benzotriazoles, resorcins and salicylates), dyes or pigments, flame retardants, antistatic agents, nucleating agents (crystallinity improvers), lubricants, plasticizers and release agents. Of course, two or more of these additives can be combinedly used.

In order to improve the flowability of the composition of the present invention, radical generators can be added. Preferable radical generators are exemplified by benzoyl peroxide, lauryl peroxide, azobisisobutyronitrile, dicumyl peroxide, t-butyl hydroperoxide, $\alpha,\alpha'$-bis(t-butyl peroxydiisopropyl)benzene, di-t-butyl peroxide and 2,5-di-(t-butyl peroxy)hexyne.

The method for preparing the composition of the present invention is not especially limited. One example is a method to use open rolls, in which materials are fed on a plurality of heated rolls and they are kneaded to be mixed. In another method, materials are fused and mixed together by using an intensive mixer such as Banbury mixer. The productivity of these methods, however, is not high because they are batchwise. The use of an extruder is, therefore, preferable. An extruder having a full-flighted screw can be used but kneading is sometimes insufficient, so that, it is preferable to use an extruder having a kneading zone or a twin-screw extruder.

When the component materials of the composition of the present invention are mixed, it is of course possible to knead the above-mentioned four components simultaneously. However, it is also possible to knead two or three components firstly and the remaining component or components are then added.

The function of each component to the performance of the composition of the present invention has not yet been clear. The inventors, however, considers as follows:

The PP (a) contributes to the thermal resistance, glossiness and moldability. The $\alpha$-olefin copolymer (b) contributes to the softness, impact resistance and paintability. The ULDPE (c) contributes to the softness, impact resistance, paintability and restorable property. PE (d) contributes to the surface gloss of molded articles and improvement of stickiness.

As described above, since the composition of the present invention has various excellent properties, it can be advantageously employed as a thermoplastic resin in the fields where conventional TPE has been used. In addition, the composition of the present invention can be suitably used in the field of vehicle exterior members wherein some problems to be solved are left with the conventional TPE. That is, the superiority not only in the impact resistance, thermal resistance, paintability and surface gloss but also in the restorable property in slight clash or collision, is required of the exterior members such as a bumper, facia, spoiler, front apron, fender, side protector, mudguard, sill and ornamental accessories. The present invention can provide an excellent material which meets all of these requirements.

EXAMPLE

The present invention will be described in more detail with reference to several examples. Incidentally, the materials and test methods used herein are as follows:

Compounding Materials

TABLE 1

Crystalline Propylene Polymer (PP) (a)

| Symbol | MFR (g/10 min.) | Ethylene Content (wt %) | Maker |
| --- | --- | --- | --- |
| A-1 | 36 | 12 | Mitsui Toatsu Chemicals, Inc. |
| A-2 | 8 | 6 | Mitsui Toatsu Chemicals, Inc. |

TABLE 2

Amorphous α-Olefin Copolymer (b)

| Symbol | Propylene Content (wt %) | MFR (230° C.) | Maker | Grade |
| --- | --- | --- | --- | --- |
| B-1 | 20 | 3.6 | Japan Synthetic Rubber Co., Ltd. | EP01P |
| B-2 | 26 | 3.5 | Japan Synthetic Rubber Co., Ltd. | EP02P |
| B-3 | 28 | 0.4 | Japan Synthetic Rubber Co., Ltd. | EP57P(*1) |
| B-4 | 20(*2) | 6.2 | Mitsui Petrochem. Industries, Ltd. | Tafmer A4085 |

Notes:
(*1)EPDM (Diene content 15 wt %)
(*2)Content of butene-1

TABLE 3

Ethylene-α-Olefin Copolymer (ULDPE) (c)

| Symbol | Gravity (g/cm³) | MFR (g/10 min.) | α-Olefin | $T_m$ (°C.) | $C_6$ Insol. Mat. (wt %) | Maker |
| --- | --- | --- | --- | --- | --- | --- |
| C-1 | 0.897 | 2.5 | Propylene | 121 | 68 | Nippon Petrochem. Co., Ltd. |
| C-2 | 0.901 | 1.2 | Butene-1 | 121 | 82 | Nippon Petrochem. Co., Ltd. |
| C-3 | 0.906 | 0.8 | Butene-1 | 122 | 88 | Nippon Petrochem. Co., Ltd. |
| C-4 | 0.903 | 1.5 | Hexene-1 | 121 | 84 | Nippon Petrochem. Co., Ltd. |

Notes

Ethylene and an α-olefin such as propylene or butene-1 were copolymerized using a catalyst consisting of triethyl aluminum and a solid catalyst component obtained from anhydrous magnesium chloride, 1,2-dichloroethane or anthracene and titanium tetrachloride.

TABLE 4

Ethylene Polymer (PE) (d)

| Symbol | Gravity (g/cm³) | MFR (g/10 min.) | Type of Polymer | Maker |
| --- | --- | --- | --- | --- |
| D-1 | 0.925 | 0.7 | Ethylene-butene-1 copolymer | Nippon Petrochem. Co., Ltd. |
| D-2 | 0.921 | 1.1 | Ethylene-butene-1 copolymer | Nippon Petrochem. Co., Ltd. |
| D-3 | 0.930 | 0.9 | Ethylene-propylene copolymer | Nippon Petrochem. Co., Ltd. |

TABLE 5

Inorganic Filler (e)

| Symbol | Kind | Av. Particle Size | Maker | Grade |
| --- | --- | --- | --- | --- |
| E-1 | Talc | 2μ | Asada Milling Co., Ltd. | JA-13R |
| E-2 | Calcium carbonate | 1.2μ | Nitto Funka Kogyo K. K. | NC-1010 |

Test Methods

The tests were carried out in accordance with the following test standards:

| | |
| --- | --- |
| MFR: | ASTM D 1238 |
| Tensile Strength: | ASTM D 638 |
| Flexural Modulus: | ASTM D 790 |
| Izod Impact Strength: | ASTM D 256 |
| Du Pont Impact Strength: | JIS K 6718 |
| Thermal Deformation Temperature: | ASTM D 648 |

Other tests were carried out through the following procedures:

Peeling Strength of Coating

Injection molded plate (3 mm thick) was washed with trichloroethane and applied with a primer (trademark: "Plagloss No. 1100 P" made by Nippon Oil & Fats Co., Ltd.). The plate was then coated by a finish coating material (trademark: "Flexthane 101" made by Nippon Bee Chemical Co., Ltd.) to form an about 50 micron thick coating. This was baked to 120° C. for 40 minutes and used for this test. A slit of 10 mm width was formed in the coated plate and the peeling strength at 180° was determined by using a tensile tester.

Shape Restorable Property

An injection molded plate (3 mm thick, 70×200 mm) was bent for 180° around a bar of 10 mm in diameter and it was left to stand at 80° C. for 2 hours. The remained strain when it is placed on a plane surface (the maximum gap between the test piece and plane surface) was measured.

Stickiness of Products

Two pieces of injection molded plate were put together in layers and upper plate was held. When the lower plate dropped, it was indicated by a mark "O". In the case that the lower one did not drop by stickiness, it was indicated by a mark "X".

EXAMPLES 1 TO 12

The materials in Tables 1 to 5 were preliminarily mixed by Henschel mixer with the compounding ratios shown in the following Table 6. The mixture was kneaded at 220° C. using a 30 mm diameter twin screw extruder (type BTS-30 made by Research Laboratory of Plastics Technology) to obtain pellets. Test pieces were prepared from the pellets by using an injection molding machine (type IS-90 made by Toshiba Machine Co., Ltd.) at a temperature of 200° C. and a pressure of 1000 Kg/cm². Several properties were then measured, the results of which are shown in the following Table 6.

COMPARATIVE EXAMPLES 1 TO 10

Test pieces were prepared in the like manner as the foregoing examples with the compounding ratios shown in Table 6 and several properties were measured. The results are shown also in Table 6.

EXAMPLES 13 TO 14

Inorganic fillers, E-1 and E-2 of 20 and 40% by weight were respectively added to the compositions consisting of A to D as shown in Table 6. The test results are shown in Table 6.

As will be understood from the results in the following Table 6, the compositions prepared according to the present invention are excellent in several properties such as low-temperature impact resistance, thermal resistance and shape restorable property. It can be suitably used as a thermoplastic resin not only in the fields where conventional TPE has been used but also in the field of the production of vehicle exterior members and other various products in which the conventional TPE was regarded as unsatisfactory.

pha-olefin copolymer (b) comprising two or more α-olefins each having 2 to 8 carbon atoms, having a density no greater than about 0.89 g/cm$^3$, said copolymer (b) containing no more than 10% by weight of boiling n-hexane insoluble matter and having a maximum peak temperature $T_m$ of below 100° C. as measured by differential scanning calorimetry (DSC); 5 to 50% by weight of an ethylene-alpha-olefin copolymer (c), said copolymer (c) having a density of 0.860 to less than 0.910 g/cm$^3$, 10% by weight or more of boiling n-hexane insoluble matter and a maximum peak temperature $T_m$ of 100° C. or higher as measured by differential scanning calorimetry (DSC); and 5 to 30% by weight of an ethylene polymer (d) having a density of 0.910 to 0.965 g/cm$^3$, wherein the total of said components (a), (b), (c) and (d) represents 100% by weight of said composition.

2. The polyolefin composition in claim 1, wherein said crystalline propylene polymer (a) is an propylene-ethylene block copolymer of 3 to 25% by weight in ethylene content.

TABLE 6

| Example Number | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Composition | | | | | | | | | | | | |
| (a): (wt %) | A-1: 30 | A-1: 40 | A-1: 50 | A-1: 40 | A-1: 40 | A-2: 60 | A-1: 40 | A-2: 40 | A-1: 35 | A-1: 35 | A-1: 35 | A-1: 35 |
| (b): (wt %) | B-1: 30 | B-1: 25 | B-2: 25 | B-2: 25 | B-4: 30 | B-2: 15 | B-3: 25 | B-1: 30 | B-1: 40 | B-3: 20 | B-1: 15 | B-1: 30 |
| (c): (wt %) | C-1: 20 | C-1: 20 | C-1: 15 | C-2: 20 | C-2: 15 | C-2: 15 | C-2: 15 | C-2: 15 | C-3: 20 | C-1: 10 | C-2: 30 | C-1: 40 | C-4: 15 |
| (d): (wt %) | D-1: 20 | D-1: 15 | D-1: 10 | D-2: 15 | D-2: 15 | D-2: 10 | D-3: 20 | D-3: 10 | D-1: 15 | D-2: 15 | D-3: 10 | D-1: 20 |
| (e): (wt %) | — | — | — | — | — | — | — | — | — | — | — | — |
| Physical Properties | | | | | | | | | | | | |
| MFR (230° C., g/10 min.) | 4.8 | 6.6 | 9.1 | 6.1 | 10.6 | 4.4 | 5.5 | 3.2 | 6.2 | 3.8 | 6.5 | 5.4 |
| Tensile Strength (23° C., Kg/cm$^2$) | 120 | 140 | 160 | 140 | 140 | 210 | 140 | 150 | 120 | 130 | 140 | 130 |
| Flexural Modulus (23° C., Kg/cm$^2$) | 3,200 | 3,700 | 4,400 | 3,800 | 3,800 | 6,500 | 4,500 | 4,300 | 3,100 | 3,400 | 3,600 | 3,300 |
| Izod Impact Strength (−30° C., Kg.cm/cm$^2$) | >60 | >60 | >60 | >60 | >60 | >60 | >60 | >60 | >60 | >60 | >60 | >60 |
| Du Pont Impact Strength (−30° C., Kg.cm) | >300 | >300 | >300 | >300 | >300 | >300 | >300 | >300 | >300 | >300 | >300 | >300 |
| Thermal Deformation Temperature (°C.) | 50 | 57 | 68 | 60 | 60 | 90 | 70 | 70 | 50 | 53 | 55 | 51 |
| Stickiness of Products (Sticky: X Not sticky: O) | O | O | O | O | O | O | O | O | O | O | O | O |
| Peeling Strength of Coating (Kg/10 mm width) | >1.0 | >1.0 | >1.0 | >1.0 | >1.0 | >1.0 | >1.0 | >1.0 | >1.0 | >1.0 | >1.0 | >1.0 |
| Shape Restorable Property (mm) | 12 | 14 | 20 | 14 | 14 | 27 | 16 | 16 | 13 | 12 | 13 | 14 |

| Example Number | Example 13 | Example 14 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Composition | | | | | | | | | | | | |
| (a): (wt %) | A-1: 25 | A-1: 20 | A-1: 50 | A-1: 50 | A-1: 50 | A-1: 50 | A-1: 50 | A-1: 50 | A-1: 40 | A-1: 25 | A-2: 60 | A-1: 50 |
| (b): (wt %) | B-1: 25 | B-1: 20 | B-1: 50 | — | — | B-1: 30 | B-1: 30 | B-1: 15 | B-1: 25 | B-1: 10 | B-2: 30 | B-1: 5 |
| (c): (wt %) | C-1: 15 | C-1: 10 | — | C-1: 50 | — | C-1: 20 | — | C-1: 3 | C-1: 32 | C-1: 55 | — | C-1: 30 |
| (d): (wt %) | D-1: 15 | D-1: 10 | — | — | D-1: 50 | — | D-1: 20 | D-1: 32 | D-1: 3 | D-1: 10 | D-2: 10 | D-2: 15 |
| (e): (wt %) | E-1: 20 | E-2: 40 | — | — | — | — | — | — | — | — | — | — |
| Physical Properties | | | | | | | | | | | | |
| MFR (230° C., g/10 min.) | 4.5 | 3.8 | 11.2 | 9.5 | 5.0 | 10.5 | 8.1 | 5.3 | 7.6 | 4.4 | 5.2 | 7.8 |
| Tensile Strength (23° C., Kg/cm$^2$) | 130 | 100 | 140 | 160 | 200 | 150 | 170 | 180 | 130 | 100 | 200 | 190 |
| Flexural Modulus (23° C., Kg/cm$^3$) | 6,400 | 6,100 | 3,300 | 3,800 | 7,700 | 3,800 | 5,300 | 6,000 | 3,100 | 2,300 | 6,000 | 7,200 |
| Izod Impact Strength (−30° C., Kg.cm/cm$^2$) | >60 | >60 | >60 | 30 | 10 | >60 | 40 | 20 | >60 | >60 | 50 | 15 |
| Du Pont Impact Strength (−30° C., Kg.cm) | >300 | >300 | >300 | >300 | 100–120 | >300 | >300 | 160–180 | >300 | >300 | >300 | 140–160 |
| Thermal Deformation Temperature (°C.) | 92 | 88 | 47 | 55 | 100 | 60 | 81 | 88 | 48 | 37 | 91 | 96 |
| Stickiness of Products (Sticky: X Not sticky: O) | O | O | X | X | O | X | O | O | X | X | X | O |
| Peeling Strength of Coating (Kg/10 mm width) | >1.0 | >1.0 | >1.0 | 0.5 | 0.4 | >1.0 | >1.0 | >1.0 | >1.0 | 0.5 | >1.0 | >1.0 |
| Shape Restorable Property (mm) | 25 | 26 | 20 | 18 | 30 | 16 | 20 | 24 | 14 | 12 | 25 | 26 |

What is claimed is:

1. A polyolefin composition which comprises 20 to 70% by weight of a crystalline propylene polymer (a); 10 to 50% by weight of a substantially amorphous al- 3. The polyolefin composition in claim 1, wherein said substantially amorphous α-olefin copolymer (b) is ethylene-propylene rubber.

4. The polyolefin composition in claim 1, wherein the melt flow rate of said substantially amorphous α-olefin copolymer (b) is in the range of 0.1 to 10 g/10 min.

5. The polyolefin composition in claim 1, wherein said ethylene-α-olefin copolymer (c) is a copolymer of ethylene and α-olefin having 3 to 8 carbon atoms.

6. The polyolefin composition in claim 1, wherein the content of α-olefin of said ethylene-α-olefin copolymer (c) is 2 to 40 molar percent.

7. The polyolefin composition in claim 1, wherein melt flow rate of said ethylene-α-olefin copolymer (c) is in the range of 0.1 to 20 g/10 min.

8. The polyolefin composition in claim 1, wherein said ethylene polymer (d) is a copolymer of ethylene and α-olefin and the density thereof is in the range of 0.915 to 0.940 g/cm$^3$.

9. The polyolefin composition in claim 1, wherein up to 100 parts by weight of an inorganic filler or fillers (e) are added to 100 parts by weight of said composition comprising said components (a), (b), (c) and (d).

10. A vehicle exterior member comprising the composition of claim 1.

11. A vehicle member in accordance with claim 10 wherein said member is selected from the group consisting of a bumper, a facia, a spoiler, a front apron, a fender, a side protector, a mudguard, a sill and an ornamental accessory.

12. A vehicle member in accordance with claim 10 wherein said member includes up to 100 parts by weight, per 100 parts by weight of said composition, of at least one inorganic filler (e).

13. A vehicle member in accordance with claim 12 wherein said member is selected from the group consisting of a bumper, a facia, a spoiler, a front apron, a fender, a side protector, a mudguard, a sill and an ornamental accessory.

* * * * *